United States Patent
Ezaki et al.

(10) Patent No.: US 6,266,480 B1
(45) Date of Patent: *Jul. 24, 2001

(54) APPARATUS AND METHOD FOR EFFECTIVELY INHIBITING UNAUTHORIZED COPYING OF PICTURE SIGNALS WHICH DOES NOT INTERFERE WITH AN AUTHORIZED DISPLAY THEREOF

(75) Inventors: Tadashi Ezaki; Jun Hirai, both of Tokyo (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/931,799

(22) Filed: Sep. 16, 1997

(30) Foreign Application Priority Data

Sep. 18, 1996 (JP) .................................................. 8-246685

(51) Int. Cl.[7] ...................................................... H04N 5/91
(52) U.S. Cl. ................................ 386/94; 360/60; 380/201
(58) Field of Search ................................. 386/94; 360/60; 380/3, 4, 5, 10, 22, 201–204, 240–241; 348/469, 473, 5.5, 6, 10, 12, 13; 711/164; 455/3.1, 3.2, 4.1, 4.2, 5.5, 6.1, 6.2, 6.3

(56) References Cited

U.S. PATENT DOCUMENTS

| | | | | |
|---|---|---|---|---|
| 4,439,830 | * | 3/1984 | Chueh ................................. | 711/164 |
| 4,475,123 | * | 10/1984 | Dumbauld et al. .................... | 348/10 |
| 5,295,187 | * | 3/1994 | Miyoshi ................................ | 386/94 |
| 5,315,448 | | 5/1994 | Ryan . | |
| 5,592,651 | * | 1/1997 | Rackman ................................. | 380/4 |
| 5,659,613 | * | 8/1997 | Copeland et al. ....................... | 380/4 |
| 5,689,559 | * | 11/1997 | Park ........................................ | 360/60 |
| 5,799,081 | * | 8/1998 | Kim et al. .............................. | 380/5 |
| 5,831,663 | * | 11/1998 | Waterhouse et al. ................. | 348/5.5 |

FOREIGN PATENT DOCUMENTS 0 691 787 A    1/1996    (EP) .

* cited by examiner

Primary Examiner—Wendy R. Garber
Assistant Examiner—Christopher Onuaku
(74) Attorney, Agent, or Firm—Frommer Lawrence & Haug, LLP.; William S. Frommer; Dennis M. Smid

(57) ABSTRACT

A digital satellite broadcasting system for providing copy protection or so-called macrovision signals which hinder the recording of designated picture signals and which do not adversely affect the performance of a television receiver. Such satellite broadcasting system may include a broadcasting station, a satellite, and a plurality of satellite receivers each located at a subscriber's premises and coupled to the subscriber's television receiver and recording/reproducing device (VTR). Parameters pertaining to a number of types of television receivers may be transmitted from the satellite broadcasting station by way of the satellite to the satellite receivers. Upon receiving such transmitted parameters, each respective satellite receiver obtains the parameters associated with the respective television. Such obtained parameters are utilized in forming a macrovision signal which is combined with video data and supplied to the respective television receiver. As a result of using parameters associated with the respective television receiver in forming the macrovision signal, the performance of such television receiver is not adversely affected and picture signals of designated programs which are recorded on the VTR will produce unacceptable pictures upon reproduction so as to provide the desired copy protection.

22 Claims, 15 Drawing Sheets

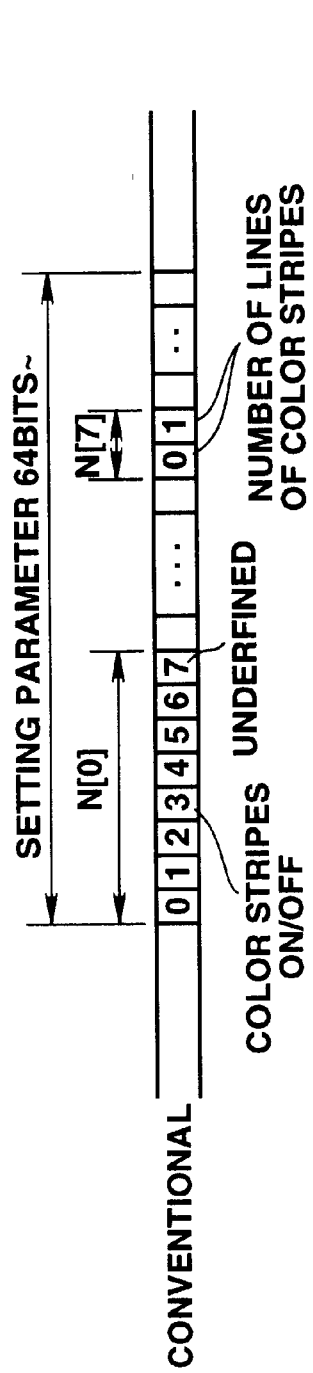
FIG.11A CONVENTIONAL
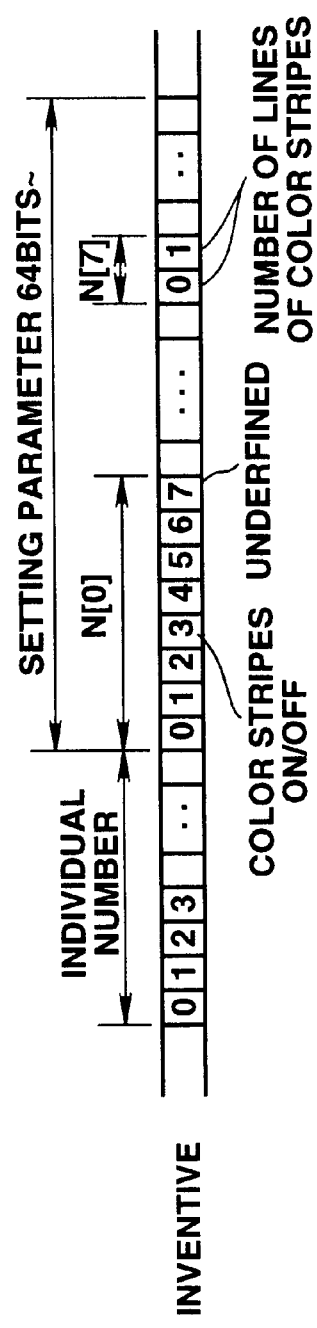
FIG.11B INVENTIVE

APPARATUS AND METHOD FOR EFFECTIVELY INHIBITING UNAUTHORIZED COPYING OF PICTURE SIGNALS WHICH DOES NOT INTERFERE WITH AN AUTHORIZED DISPLAY THEREOF

BACKGROUND OF THE INVENTION

The present invention relates to a data transmission and/or receiving technique and to a data reproducing technique in which a copy inhibit signal is added to main signals such as digital video signals obtained from digital satellite broadcasting signals or digital video signals reproduced from a digital video disc (DVD) or the like.

FIG. 1 illustrates a digital satellite broadcasting system for broadcasting signals, such as video signals which may have been compressed by utilizing a so-called MPEG 2 (moving picture experts group) standard picture compression technique, to a number of subscribers. Such digital satellite broadcasting system generally includes a satellite broadcasting station 210, a broadcasting satellite 220, and a satellite broadcasting receiver 230. The broadcasting satellite 220 may receive broadcast signals transmitted from the broadcasting station 210 and may transmit such received signals to earth. The satellite broadcasting receiver 230, which is mounted in or near the premises of a respective subscriber, may receive the broadcast signals from the broadcasting satellite 220.

More specifically, in the above-mentioned digital satellite broadcasting system, a program may be encoded by an MPEG encoder so as to form an MPEG transport stream (MPEG-TS) which is modulated for satellite broadcasting and transmitted from the satellite broadcasting station 210 by way of a parabola antenna 211 to the broadcasting satellite 220. The broadcasting satellite 220 transmits such program signals so as to be received by the satellite broadcasting receivers 230. As shown in FIG. 1, a respective satellite broadcasting receiver 230 may be coupled to a television receiver 240 and/or a video tape recorder 250.

FIG. 2 illustrates the satellite broadcasting receiver 230. As shown therein, such receiver generally includes a station selection unit 231, a demodulator 232, a data decoder 233, a descrambler 234, an MPEG decoder 235, and a video outputting signal processor 236.

In the satellite broadcasting receiver 230, a channel desired by a user may be selected by use of the station selection unit or tuner 231. A signal of the selected channel or station from the tuner 231 is supplied to the demodulator 232 so as to be demodulated in a predetermined manner. Demodulated digital signals from the demodulator 232 are supplied to the data decoder 233 and the descrambler 234. The data decoder 233 may receive key information from an IC card 237 which may have been provided by the service providers of the respective satellite broadcasting system and may decode such key information and supply the same to the descrambler 234. The descrambler 234 may descramble the demodulated digital signals received from the demodulator 232 by using the key information received from the data decoder 233. Descrambled signals from the descrambler 234 may be supplied to the MPEG decoder 235. If the selected channel signal from the tuner 231 is not scrambled, the descrambler 234 may not perform any descrambling operations and may instead merely supply the output from the demodulator 232 to the MPEG decoder 235. The MPEG decoder 235 may decode the MPEG-TS signals from the descrambler 234 to form decoded digital video signals and may supply the same to the video outputting signal processor 236.

The video outputting signal processor 236 includes a video encoder 361, a macrovision signal generator 362, an adder 363, and a digital-to-analog (D/A) converter 364. The video encoder 361 converts the digital video signals from the MPEG decoder 235 into signals conforming to a predetermined television standard, such as a NTSC standard. Output signals from the NTSC encoder 361 may be combined with output signals from the macrovision signal generator 236 by the adder 363, as hereinafter more fully described. Digital output signals from the adder 363 may be converted to analog video signals in accordance with the predetermined television standard by the D/A converter 364.

The above-mentioned digital satellite broadcasting system may use a so-called pay-per-view service wherein viewers or subscribers are charged a fee to enable viewing of a selected desired program. Typically, in such pay-per-view service, a subscriber may select a desired pay-per-view program from a program table displayed on the television receiver 240 which is supplied thereto from the satellite broadcasting station 210 by way of the broadcasting satellite 220. The subscriber may cause information pertaining to the selected program to be supplied from the satellite broadcasting receiver 230 to the satellite broadcasting station or supervising company by way of a telephone network or the like. The key information utilized for decoding the selected program may be transmitted from the satellite broadcasting station 210 to the respective satellite broadcasting receiver 230 by way of the broadcasting satellite 220, whereupon the desired program is enabled to be viewed and the subscriber is charged.

A pay-per-view program may be displayed on the television receiver 240, but may be inhibited from being recorded by the video tape recorder 250 or the like so as to provide copyright protection. To inhibit such recording, a so-called macrovision or copy protect signal which may inhibit picture recording is added to the pay-per-view program. More specifically, the digital satellite broadcasting station 210 may transmit various additional data, such as key information for decoding, a program table, and/or operating parameters for hardware, along with video and audio data to the satellite broadcasting receiver 230. The received data may be detected or decoded by the data decoder 233 of the satellite broadcasting receiver 230 so as to form a signal for controlling the macrovision signal generator 362. Such control signal may be supplied to the macrovision signal generator 362, whereupon a macrovision signal may be generated and combined with the digital video signals from the NTSC encoder 361 by the adder 363.

The data decoder 233 is illustrated in FIG. 3. As shown therein, the data decoder 233 includes a switch 331, a control code register 332, a control code analyzer 333, and data stream processor 334. Upon detecting a control code packet, the switch 331 is changed so that a control code, which may have 64 bits, is supplied to the control code register 332. The control code from the 64-bit control code register 332 is supplied to the control code analyzer 333 wherein the received control code may be analyzed and parameter setting information and/or on/off control information may be generated and supplied to the macrovision signal generator 362. On the other hand, if signals other than a control code packet are supplied to the switch 331, the switch is changed so that such other signals are supplied to the data stream processor 334 wherein information, such as a program table, may be extracted and processed.

Two types of signals, that is, a pseudo horizontal synchronization pulse and a color stripe, may be utilized as macrovision signals. The two resulting systems will now be described.

In a pseudo horizontal synchronization pulse system, a pseudo horizontal synchronization pulse may be inserted into the vertical blanking period of a video signal, as shown in FIG. 4, so as to cause a malfunction of an automatic gain control (AGC) circuit of the VTR 250 (FIG. 1) and, as a result, cause the picture level to deteriorate to an unacceptable level. As such, acceptable picture recording is inhibited. In a color stripe system, the phase of a number of lines (such as four lines) of a color burst signal may be inverted every 20 lines, as shown in FIG. 5, so as to cause color inversion during reproduction from the VTR 250 and, as a result, cause the picture level to deteriorate to an unacceptable level. As such, acceptable picture recording is inhibited.

The television receiver 240 (FIG. 1) may not include an AGC circuit (as in the VTR 250) so that a displayed picture may not be disturbed or deteriorated by the pseudo horizontal synchronization pulses. However, the television receiver 240 may include an automatic phase control (APC) circuit capable of detecting the phase difference between the color burst signals and an oscillator signal for producing a reference subcarrier wave synchronized with the color burst signal. Nevertheless, the television receiver 240 may not be affected by use of a color stripe system due to a relatively long time constant of the APC circuit.

Thus, if picture signals from the satellite broadcasting receiver 230 are supplied to the video tape recorder (VTR) 250 and the television receiver 240, picture signals having a deteriorated signal quality due to the macrovision signal are recorded on the VTR, while a picture without such picture quality deterioration may be displayed on the television receiver.

Although a particular type or brand of television receiver may not be adversely affected by the use of macrovision signals as described above, other types or brands of television receivers may be adversely affected by such use of macrovision signals. As a result, these latter types of television receivers, which may have parameters different from those of the former type of television receivers, may display video pictures which are deteriorated or subject to interference as, for example, shown in FIG. 6.

Therefore, in the above-described copy protection technique, picture data synthesized or combined with macrovision signals of a pre-set parameter are supplied to all types of television receivers. Although this technique may not adversely affect the performance of some types of television receivers, such technique may adversely affect the performance of other types of television receivers which may have different set parameters, as previously described.

In addition to the above-described technique, a so-called CGMS (copy guard management system) or APS (analog protection system) technique may be utilized for controlling the outputting of a copy protection signal and enabling data pertaining thereto along with picture data or speech data to be recorded by a digital video disc (DVD) or a digital video cassette (DVC) as, for example, shown in FIG. 7. Such CGMS and APS data may be pre-set by the copyright owner. For example, the CGMS data may be 2-bit data, in which '00', '10', '01', and '11' represent copy-free, copying permitted only once, unused, and copying not permitted, respectively. On the other hand, the APS data may be 2-bit data, in which '00', '01', '10', and '11' represent pseudo horizontal synchronization pulse and color stripe signal are both off, pseudo horizontal synchronization pulse is on and color stripe signal is off, pseudo horizontal synchronization pulse is on and two lines of color stripe signal are inserted every 20 lines, and pseudo horizontal synchronization pulse is on and two lines of color stripe signal are inserted every 40 lines, respectively. Through the use of such CGMS and APS data, a particular type of copyright protection signal may (if requested) be formed and utilized. For example, if the CGMS data is set to '11' (copying inhibited), a copy protection signal may be generated and outputted in response to the APS setting value.

Thus, the DVD reproducing device or the DVC reproducing device may synthesize or combine the macrovision signal derived from CGMS and APS data with video data. However, since not all television receivers can operate acceptably with such macrovision or copy protection signals, the picture displayed on such television receivers may be deteriorated or unacceptable. Further, such DVD reproducing device or DVC reproducing device may not readily enable parameters to be altered so as to permit such television receivers to operate acceptably with the macrovision signals.

OBJECTS AND SUMMARY OF THE INVENTION

An object of the present invention to provide a data transmission and/or receiving technique and a data reproducing technique in which different macrovision signals may be supplied to television receivers having different set parameters so as to enable such television receivers not to be adversely affected by the macrovision signals and to display acceptable pictures.

In accordance with an aspect of the present invention, a data transmission method is provided which comprises the steps of generating parameter setting data for use in copy protection circuits each associated with one of a plurality of monitor devices, and transmitting a control code including the parameter setting data to data receiving devices each having one of the copy protection circuits.

In accordance with another aspect of the present invention, a data transmitting device is provided which comprises a parameter generating device for generating parameter setting data for use in copy protection circuits each associated with one of a plurality of monitor devices, and a transmission device for transmitting a control code including the parameter setting data of the copy protection circuit to data receiving devices each having one of the copy protection circuits.

In accordance with still another aspect of the present invention, a method for setting parameters of a copy protection circuit of a data receiving device is provided. Such method comprises the steps of receiving a transmitted control code having parameter setting data associated with a plurality of monitor devices, extracting the parameter setting data associated with a respective monitor device from the control code, and setting parameter data of the copy protection circuit of the data receiving device for use with the respective monitor device based on the extracted parameter setting data.

In accordance with still another aspect of the present invention, a data receiving device is provided which comprises a device for receiving input data and for separating therefrom main data and a control code having parameter setting data for use with a copy protection circuit, a device for obtaining the parameter setting data associated with the copy protection circuit from the separated control code and for setting parameters of the copy protecting circuit based on the obtained parameter setting data to enable the copy protecting circuit to generate a copy protection signal, and a device for combining the main data and the copy protection signal.

In accordance with still another aspect of the present invention, a data transmission system is provided. Such system comprises a data transmitting device having a parameter generating device for generating parameter setting data for use in copy protection circuits each associated with one of a plurality of monitor devices and a transmitting device for transmitting main data and a control code having the parameter setting data; and a data reception device including a respective one of the copy protection circuits and having a device for receiving the transmitted main data and control data and for separating therefrom the received control code, a device for obtaining the parameter setting data associated with the respective copy protection circuit from the separated control code and for setting parameters of the respective copy protecting circuit based on the obtained parameter setting data to enable the respective copy protection circuit to generate a copy protection signal, and a device for combining the main data and the copy protection signal.

In accordance with still another aspect of the present invention, a reproducing method is provided which comprises the steps of reproducing signals recorded on a recording medium, generating a copy protection signal based on parameter data set by a user, and combining the reproduced signals and the copy protection signal.

In accordance with still another aspect of the present invention, a reproducing device is provided which comprises a reproducing device for reproducing signals recorded on a recording medium, a device for setting parameter data and for generating a copy protection signal based on the parameter data, and a device for combining the reproduced signals and the copy protection signal and for outputting the combined signal.

Accordingly, the present invention enables parameters for generating copy protection signals associated with respective monitor devices to be transmitted and received by broadcasting receivers located in a subscriber's home or office. By using the received parameters, a respective broadcasting receiver may form a copy protection signal which inhibits recording by a VTR or the like and is acceptable for use with the respective television receiver or monitor device associated therewith. As a result, the respective television receiver may not be adversely affected by the copy protection signal and may provide relatively high quality pictures to be displayed thereon.

Additionally, during a reproducing operation, a copy protection signal may be generated in accordance with data set by an operator or subscriber. In such situation, the respective monitor device or television receiver may not be adversely affected by the copy protection signal.

Other objects, features and advantages according to the present invention will become apparent from the following detailed description of illustrated embodiments when read in connection with the accompanying drawings in which corresponding components are identified by the same reference numerals.

BRIEF DESCRIPTION OF THE DRAWINGS

FIGS. 11A and 11B are diagrams to which reference will be made in explaining a transport stream transmitted by the satellite broadcasting transmission device of FIG. 9;

DETAILED DESCRIPTION OF THE PREFERRED EMBODIMENTS

Preferred embodiments of the present invention will now be described.

Figure 8:
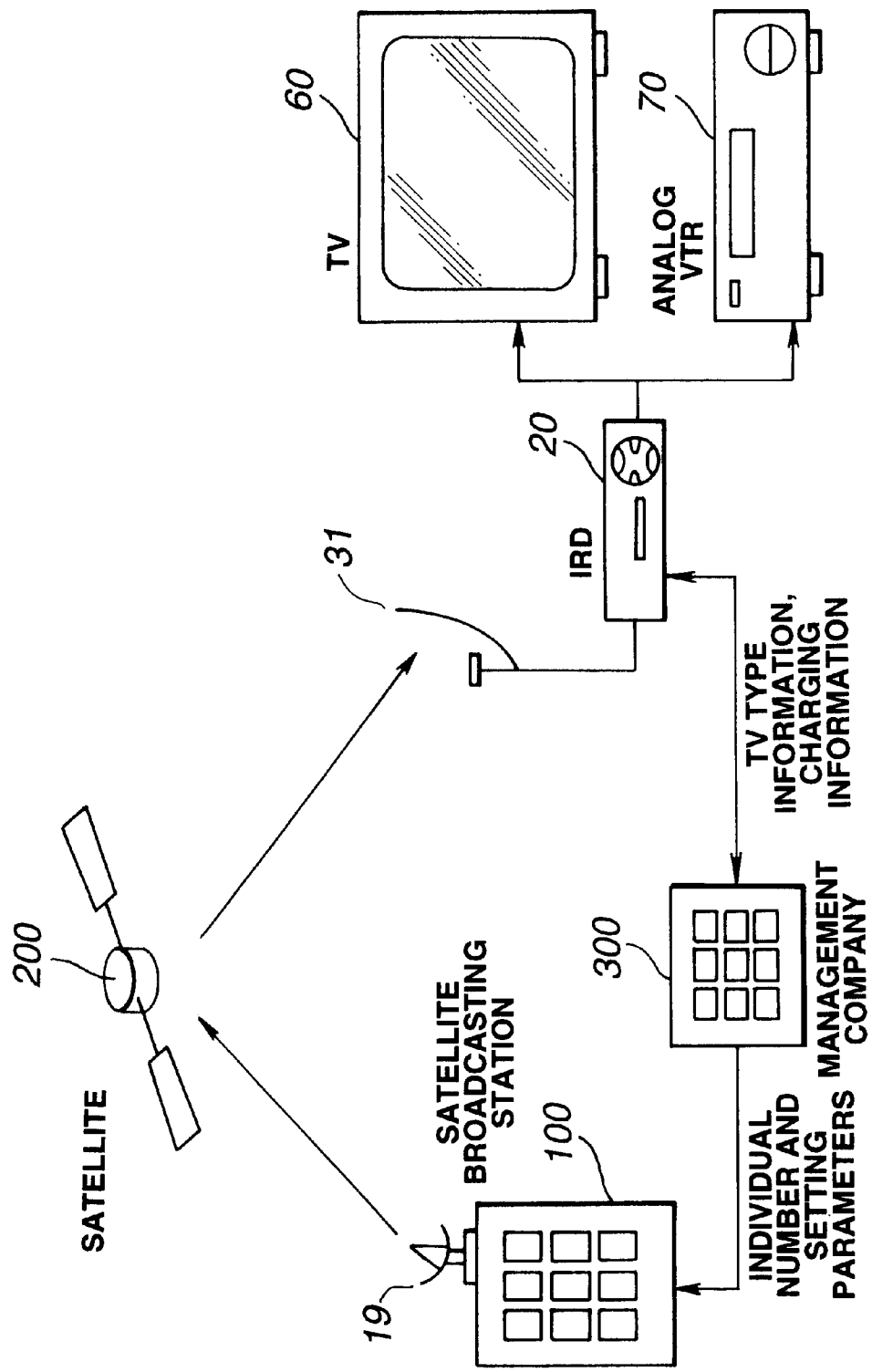
FIG. 8 illustrates a data transmitting/receiving system according to an embodiment of the present invention.

FIG. 8 illustrates a digital satellite broadcasting system. As shown therein, such digital satellite broadcasting system includes a satellite broadcasting station 100, a broadcasting satellite 200, a broadcasting satellite receiver 20, and a management company 300. The broadcasting station 100 is adapted to transmit signals by way of an antenna 19 to the satellite 200. The broadcasting satellite 200 may receive the signals from the broadcasting station 100 and transmit such signals to earth. The broadcasting satellite receiver 20, which may be an integrated receiver and decoder (IRD) or a so-called set top box (STB), may be installed at the premises of a subscriber of the present system. Such broadcasting satellite receiver 20 is adapted to receive the signals from the broadcasting satellite 200 by way of an antenna 31 and to process such received signals so as to form processed signals for supply to a television receiver 60 and/or a VTR 70. The management company 300 may receive information pertaining to the type of television receiver 60 from each subscriber and may supply information corresponding thereto, such as parameter information, to the broadcasting station 100, as hereinbelow more fully described.

In the broadcasting satellite system of FIG. 8, a subscriber may supply information, such as the type and the name of the manufacturer of the subscriber's television receiver 60 and a personal number of the IRD 230, to the management company 300 upon subscribing to the digital satellite broadcasting system. In response to such received information, the management company 300 may obtain information corresponding to parameter(s) which may be set or utilized with a macrovision signal for the respective television receiver 60 of the subscriber and may supply the same along with the personal number to the satellite broadcasting station 100. The satellite broadcasting station 100 transmits the set parameter information and the personal number in a transport stream by way of the broadcasting satellite 200 to the satellite broadcasting receiver. The satellite broadcasting receiver may detect the corresponding personal number and the set parameter information and generate a macrovision signal in accordance therewith and supply the generated macrovision signal along with video data in a transport stream to the television receiver 60.

The digital satellite broadcasting system may be based on an MPEG 2 standard.

Figure 9:
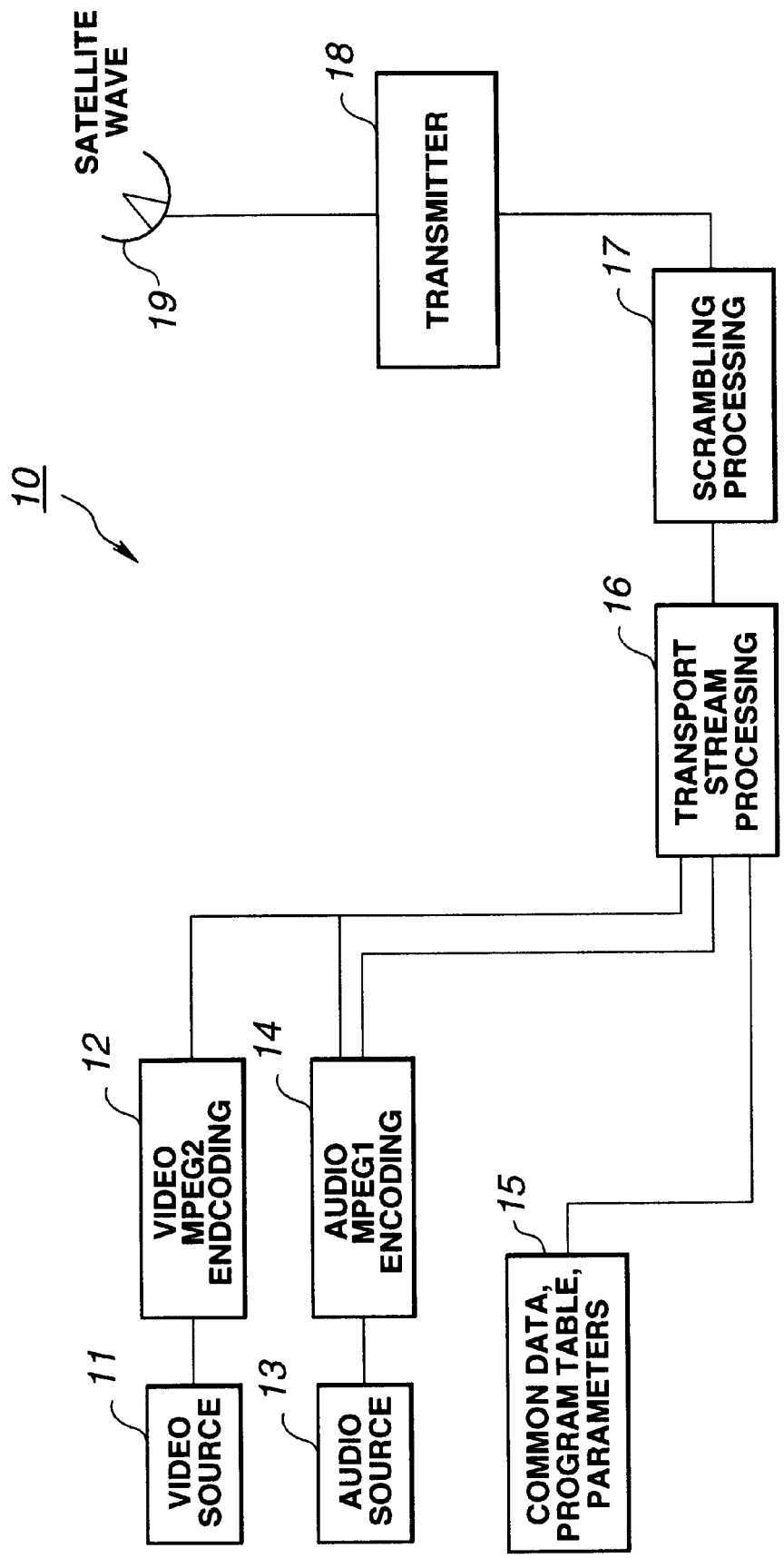
FIG. 9 is a diagram of a satellite broadcasting transmission device of the data transmitting/receiving system of FIG. 8.

The satellite station 100 may include a satellite broadcasting transmission device 10 illustrated in FIG. 9. As shown therein, such satellite broadcasting transmission device 10 includes a picture data generating unit 11, an MPEG2 encoder 12, a speech data generating unit 13, an MPEG1 encoder 14, an additional data generator 15, a transport stream processor 16, a scrambler 17, and a transmitter 18.

The picture data generating unit 11 may generate picture data and supply the same to the MPEG2 encoder 12. The MPEG2 encoder 12 encodes the received picture data in a highly efficient manner in accordance with an algorithm prescribed in MPEG2 so as to generate compressed picture data. Such compressed picture data may be supplied to the transport bitstream processor 16.

The speech or audio data generating unit 13 may generate audio data and supply the same to the MPEG1 encoder 14. The MPEG1 encoder 14 encodes the received audio data in a highly efficient manner in accordance with an algorithm prescribed in MPEG1 so as to generate compressed audio data. Such compressed audio data may be supplied to the transport stream processor 16.

The additional data generator 15 may generate a variety of additional data, such as program table data, key information for descrambling, a header for the personal number of the IRD or parameters of the copy protection signal corresponding to the personal number. The additional data generator 15 may generate the header and/or the parameter setting information (for use in setting parameters of the broadcast satellite receiver 20) in accordance with information received from the management company 300 (FIG. 8). The additional data generated by the additional data generator 15 may be supplied to the transport stream processor 16.

The transport stream processor 16 receives the compressed picture data from the MPEG2 encoder 12, the compressed audio data from the MPEG1 encoder 14, and the additional data from the additional data generator 15 and converts the same into a bitstream which is supplied to the scrambler 17.

The scrambler 17 receives the bitstream from the transport stream processor 16 and scrambles the same so as to be encrypted and forms the scrambled bitstream into packets. An output from the scrambler 17 is supplied to the transmitter 18. The transmitter 18 modulates a carrier wave in a predetermined manner with the output signal from the scrambler 17 and transmits the resulting signal as a satellite wave over the broadcasting satellite parabola antenna 19 to the broadcasting satellite 200.

As hereinafter more fully described, the additional data generated by the additional data generator 15 may function as a control code. Such data or control code may be transmitted by the transmitting device which includes the transport stream processor 16, the scrambler 17, and the transmitter 18.

Figures 10A, 10B:
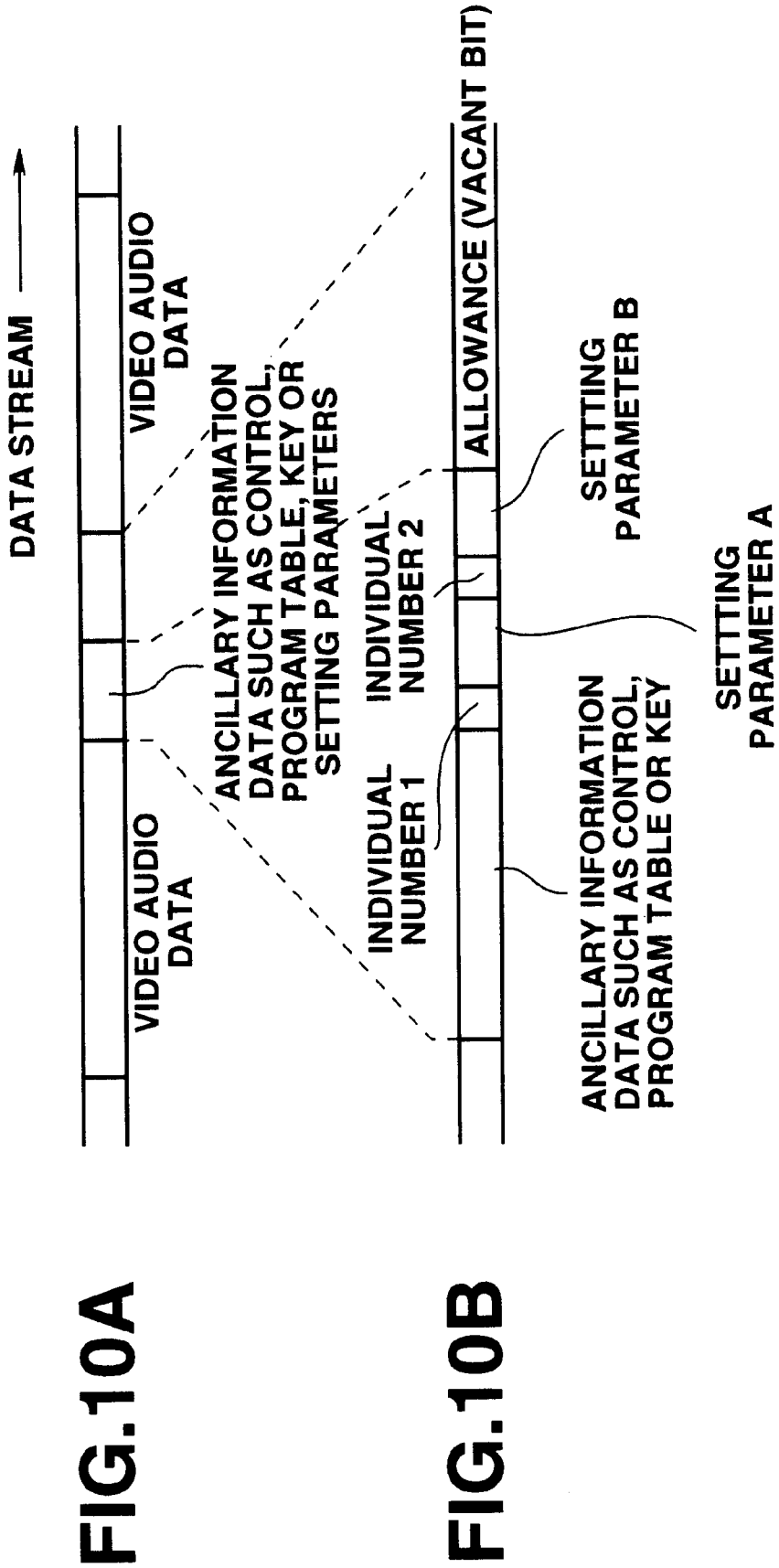
FIGS. 10A and 10B are diagrams to which reference will be made in explaining a transport stream transmitted by the satellite broadcasting transmission device of FIG. 9.

In the above digital satellite broadcasting system, a data stream may be utilized which includes various additional data, such as program table data, descrambling key information, and/or a copy protection signal, interposed between compressed video data and compressed speech data, as shown in FIG. 10 A. In such arrangement, the program table data and the key information and the like of the additional data may be followed by information relating to one or more headers of one or more personal numbers of the IRD and one or more parameters corresponding to the personal number(s). Such information may, for example, include the header of the personal number 1, information of the parameter A for the personal number 1, the header of the personal number 2, and information of the parameter B for the personal number 2, as shown in FIG. 10B.

Upon decoding the header of the personal number associated with a receiver, the satellite broadcasting receiver may obtain the information of the parameter associated therewith. For example, consider the situation in which the personal number associated with a receiver is 1. In such situation, upon decoding or detecting the header of the personal number 1, the satellite broadcasting receiver may obtain the information of the parameter A associated with the personal number 1. As a result, the satellite broadcasting receiver may generate a macrovision signal in accordance with the parameter A and combine such signal with the picture data and supply the combined signal to the corresponding television receiver 60, as hereinafter more fully described.

Figure 1:
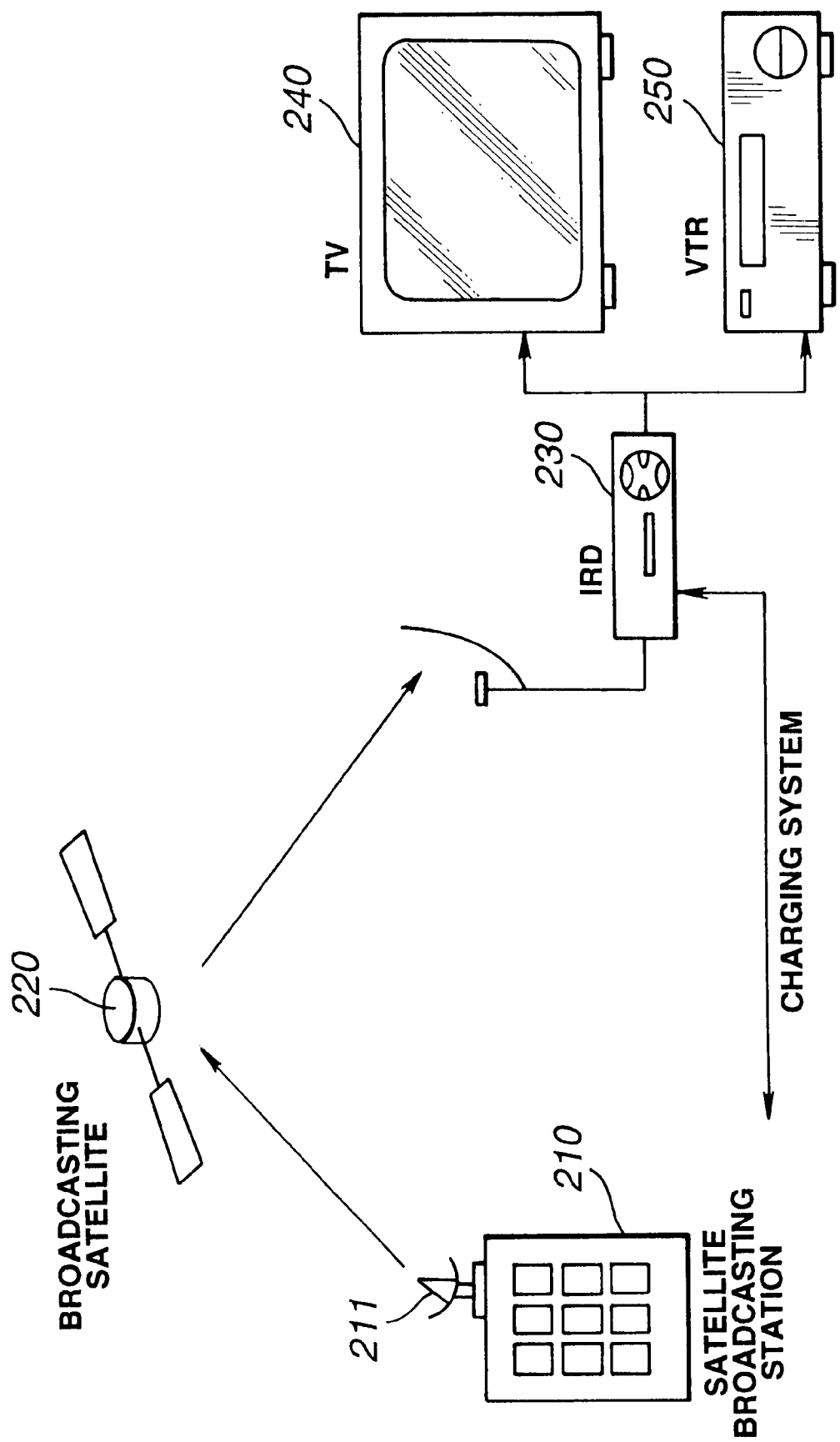
FIG. 1 is a diagram of a digital satellite broadcasting system.
Figure 2:
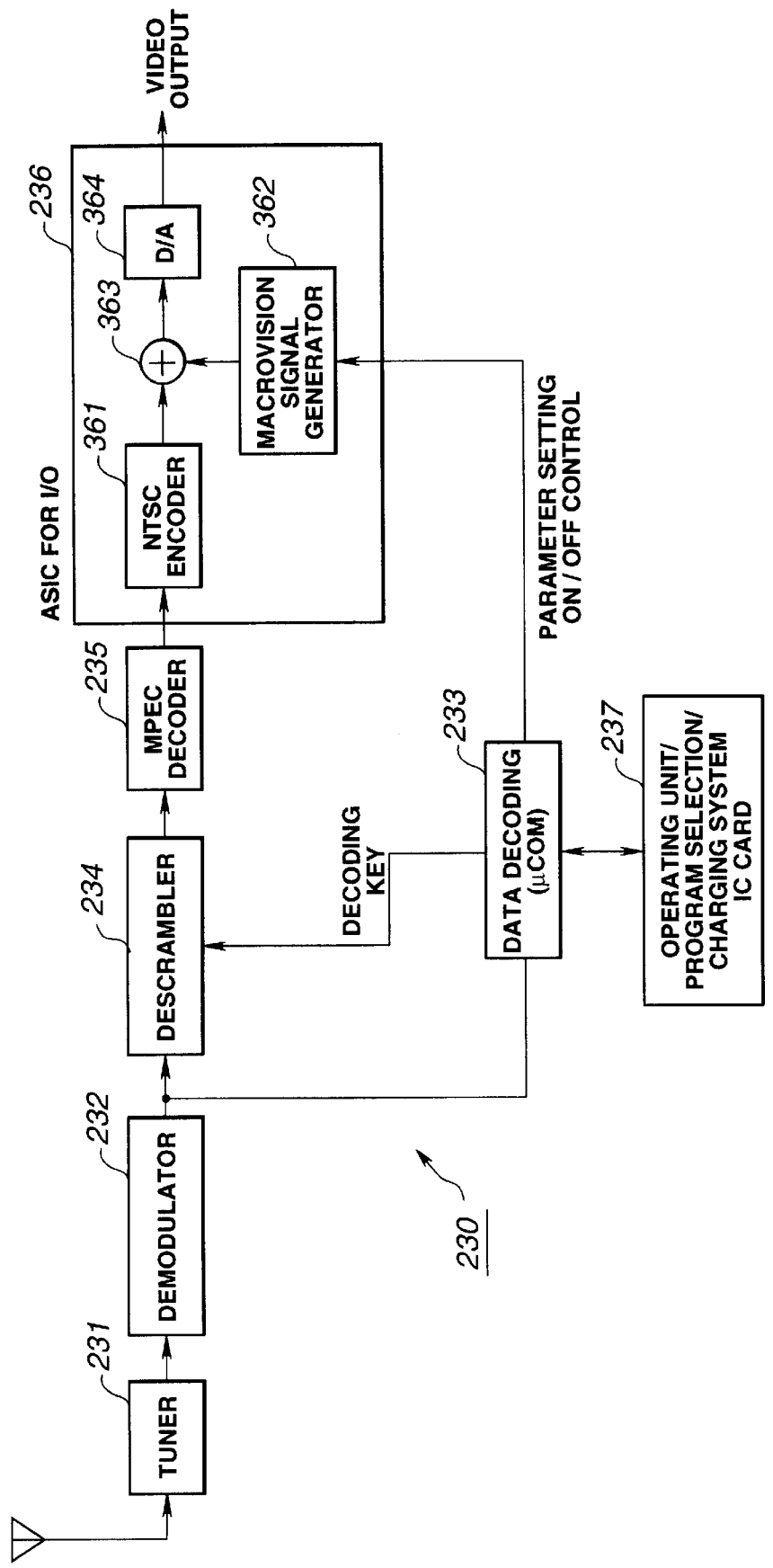
FIG. 2 is a diagram of a satellite broadcasting receiver of the digital satellite broadcasting system of FIG. 1.
Figure 3:
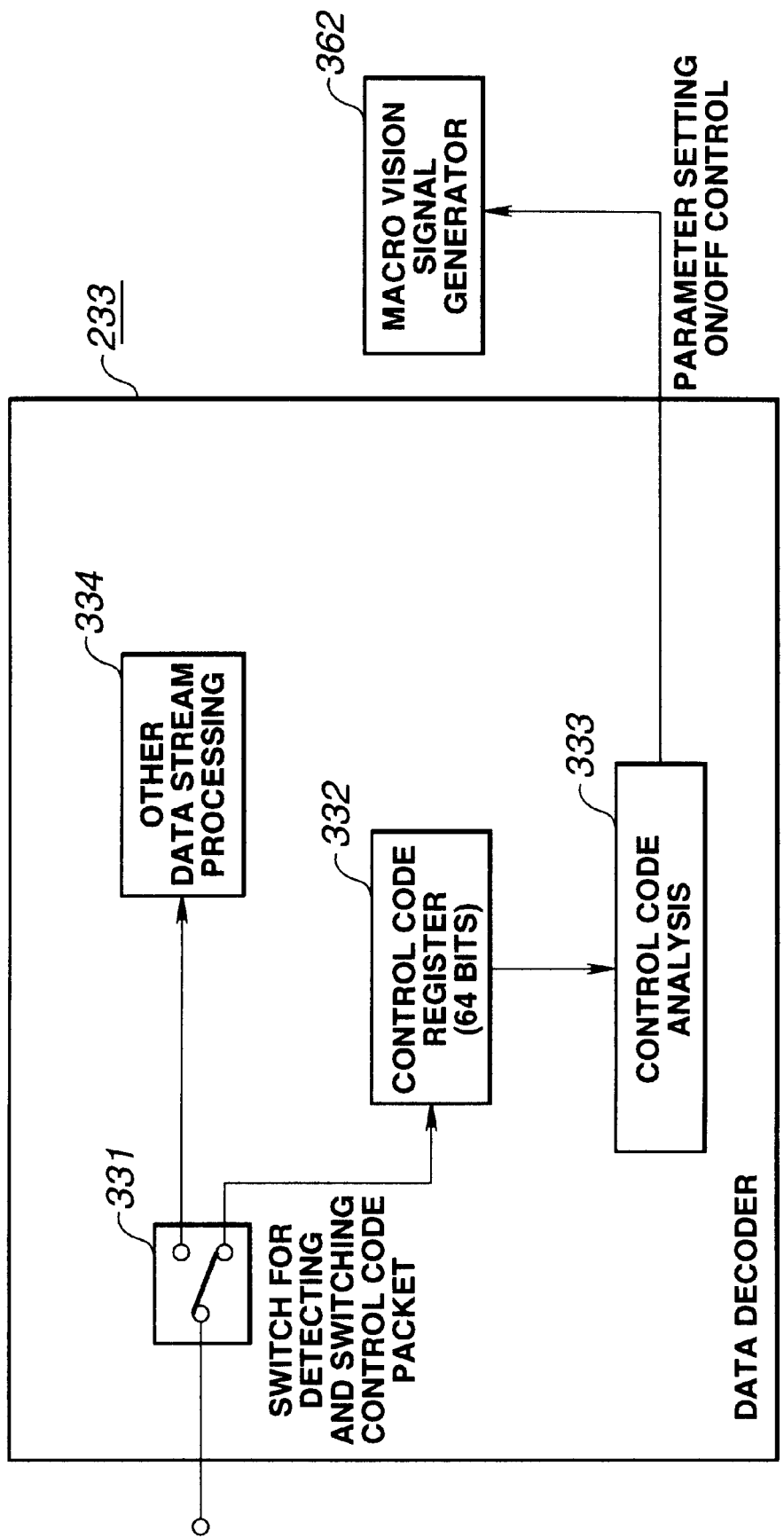
FIG. 3 is a diagram of a data decoder of the satellite broadcasting receiver of FIG. 2.
Figure 4:
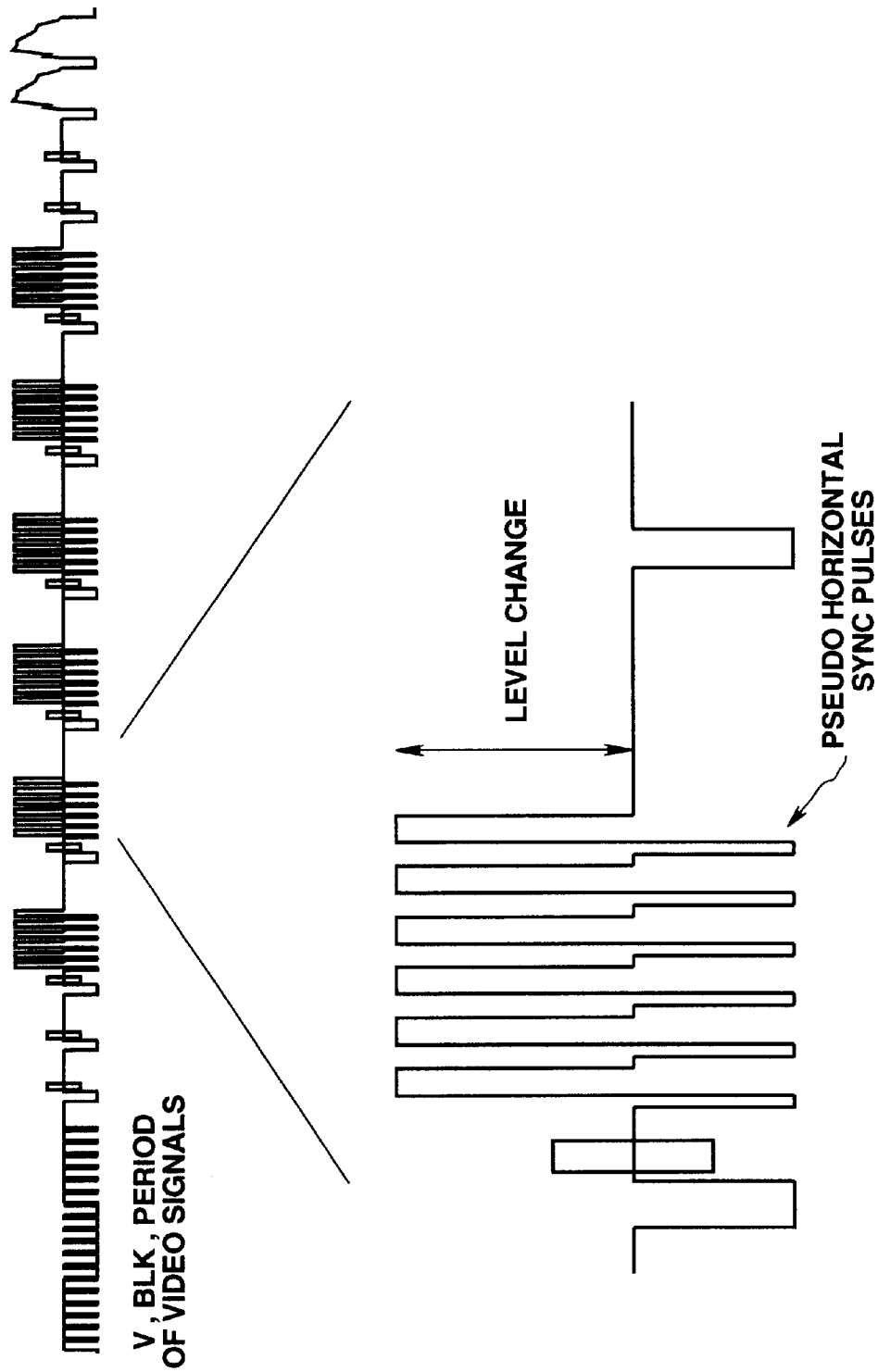
FIG. 4 is a diagram to which reference will be made in explaining a pseudo horizontal synchronization pulse system.
Figure 5:
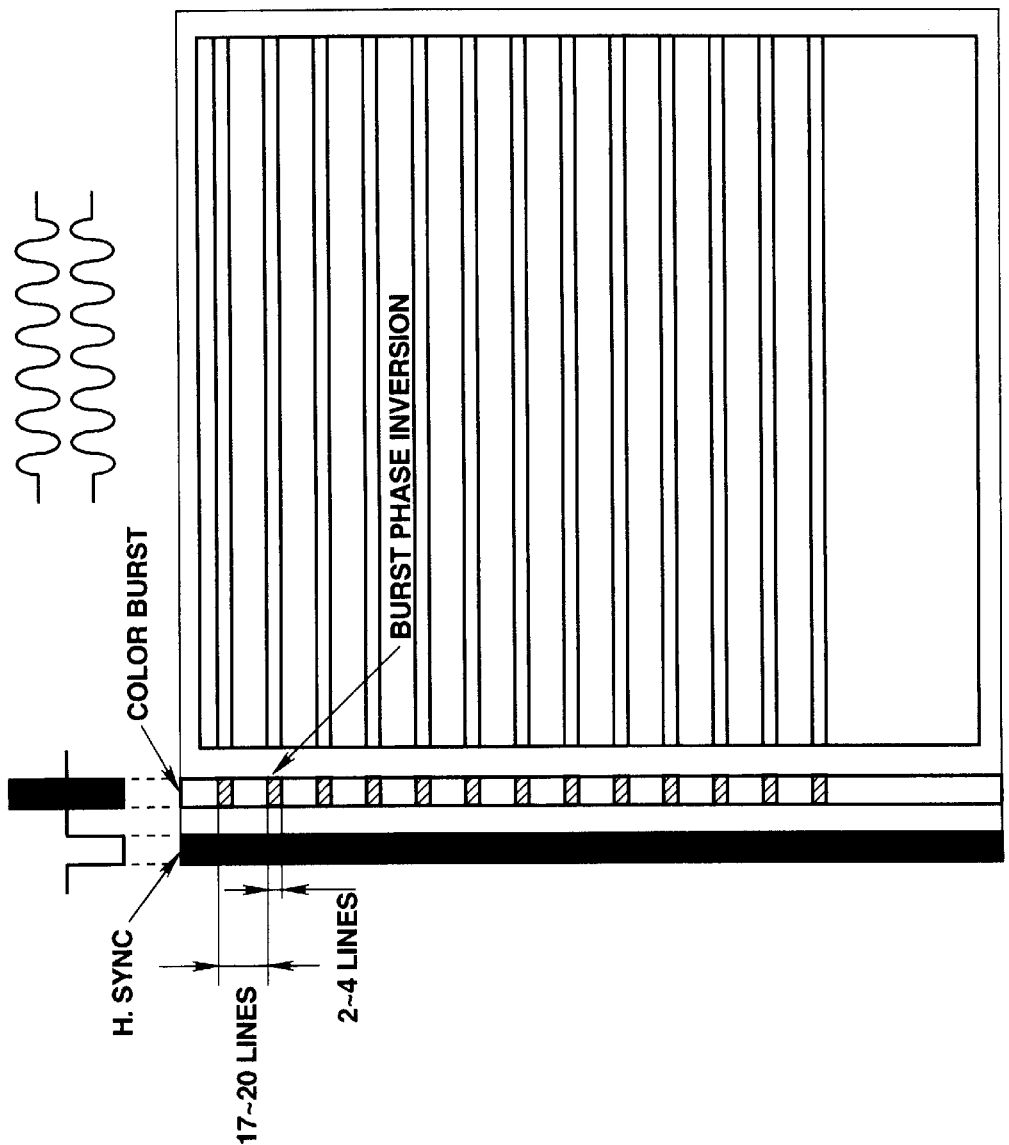
FIG. 5 is a diagram to which reference will be made in explaining a color stripe system.
Figure 6:
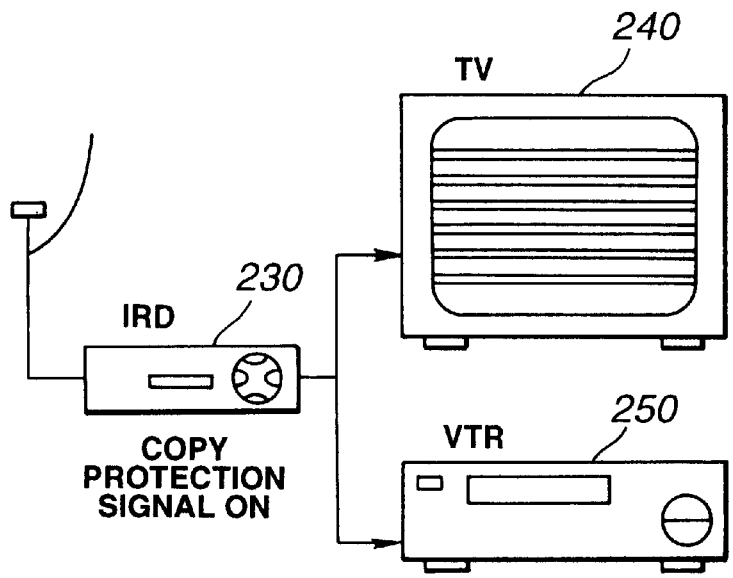
FIG. 6 is a diagram to which reference will be made in explaining the adverse affects on a particular television receiver due to a macrovision signal.
Figure 7:
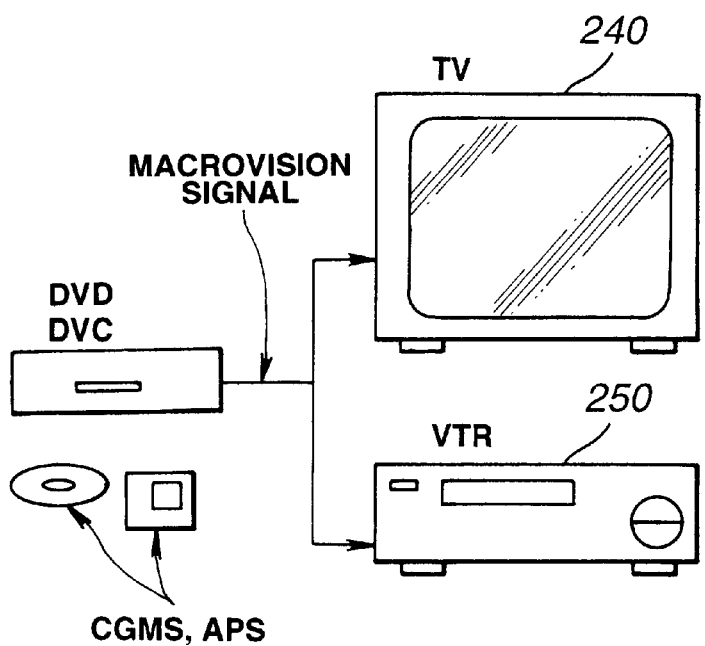
FIG. 7 is a diagram to which reference will be made in explaining the use of CGMS and APS data for formulating copy protection signals with a DVD or a DVC device.

FIG. 11A illustrates a macrovision signal which may be utilized in the digital satellite broadcasting system of FIG. 1. As shown therein, the parameters of the macrovision signal may be expressed with 64 bits of data, of which those designated by N[0] and N[7] control on/off and set the number of lines of inversion, respectively. As is to be appreciated, such arrangement of parameters in the macrovision signal may not enable either more than one set of parameters to be provided or, if more than one set is provided, easy detection of a respective one of such sets of parameters. However, the present invention enables more than one set of parameters to be transmitted and enables easy detection of the appropriate one of such sets of parameters. That is, in the present invention, the parameter setting data which is to be transmitted may be preceded (or followed) by the header of a personal number, as shown in FIG. 11B. (The arrangement of FIG. 11B corresponds to that shown in FIG. 10B.)

Figure 12:
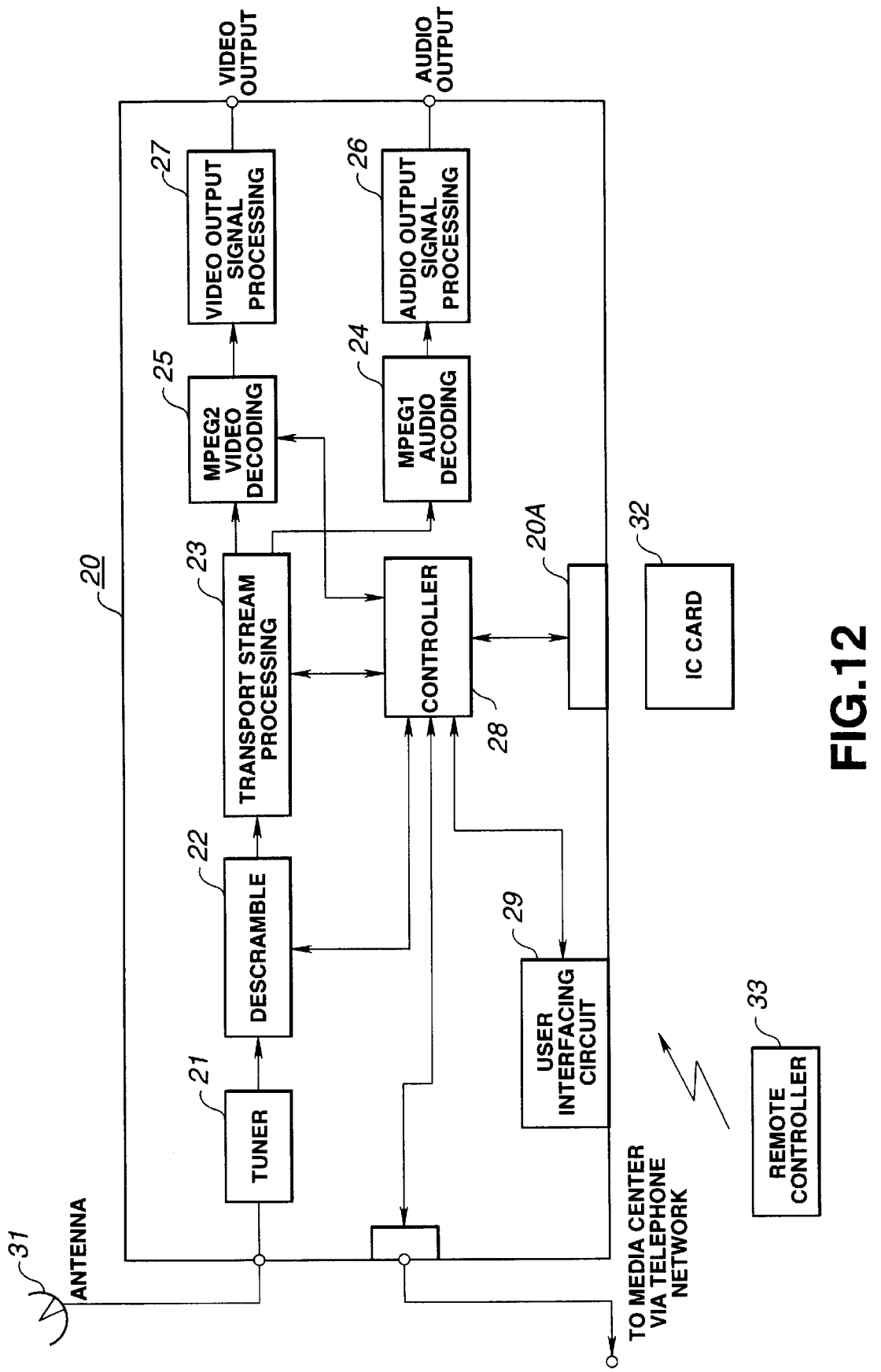
FIG. 12 is a diagram of a satellite broadcasting receiver of the data transmitting/receiving system of FIG. 8.

As previously described, each subscriber may have a satellite broadcasting receiver 20 located in his/her home or office which may receive signals transmitted from the satellite station 100 by way of the broadcasting satellite 200. Such satellite broadcasting receiver 20 is illustrated in FIG. 12. As shown therein, the satellite broadcasting receiver includes a tuner 21, a descrambler 22, a transport stream processor 23, an MPEG1 decoder 24, an MPEG2 decoder 25, a speech outputting signal processor 26, a video outputting signal processor 27, a controller 28, and a user interfacing circuit 29.

The tuner 21 is adapted to receive a broadcasted signal by way of the parabola antenna 31 and to process the same in a predetermined manner which may involve reception transponder switching, demodulation, and/or error correction. An output MPEG2 transport stream from the tuner 21 is supplied to the descrambler 22 which also receives descrambling key information from the controller 28. Such key information may be supplied to the controller 28 from an IC card 32 (wherein the key information is recorded thereon) by way of an IC card slot or reader 20A. The descrambler 22 descrambles the transport stream based on the key information and supplies the descrambled transport stream to the transport stream processor 23.

The transport stream processor 23 extracts video data and audio or speech data from the transport stream based on program specific information (PSI) supplied from the controller 28. The PSI may be obtained from operation input information supplied from a remote control operation unit 33 (due to inputs by an operator) by way of a user interfacing circuit 29 to the controller 28. The extracted audio data and picture data may be supplied to the MPEG1 decoder 24 and the MPEG2 decoder 25, respectively. Further, the transport stream processor 23 may also extract the additional data from the transport stream and may supply the same to the controller 28.

The MPEG1 decoder 24 decodes the compressed audio data received from the transport stream processor 23 in accordance with an algorithm prescribed in MPEG1 so as to convert such compressed audio data into non-compressed audio data (which may be similar to that prior to encoding). The non- or pre-compressed audio data is supplied from the MPEG1 decoder 24 to the audio outputting signal processor 26. The speech or audio outputting signal processor 26 processes the received pre-compressed audio data from the MPEG1 decoder 24 in a predetermined manner which may involve performing a digital-to-analog (D/A) conversion so as to convert the digital audio data into analog audio signals.

The MPEG2 decoder 25 decodes the compressed video data received from the transport stream processor 23 in accordance with an algorithm prescribed in MPEG2 so as to convert the compressed video data into non-compressed video data (which may be similar to that prior to encoding). The non- or pre-compressed video data is supplied from the MPEG2 decoder 25 to the picture outputting signal processor 27.

Figure 13:
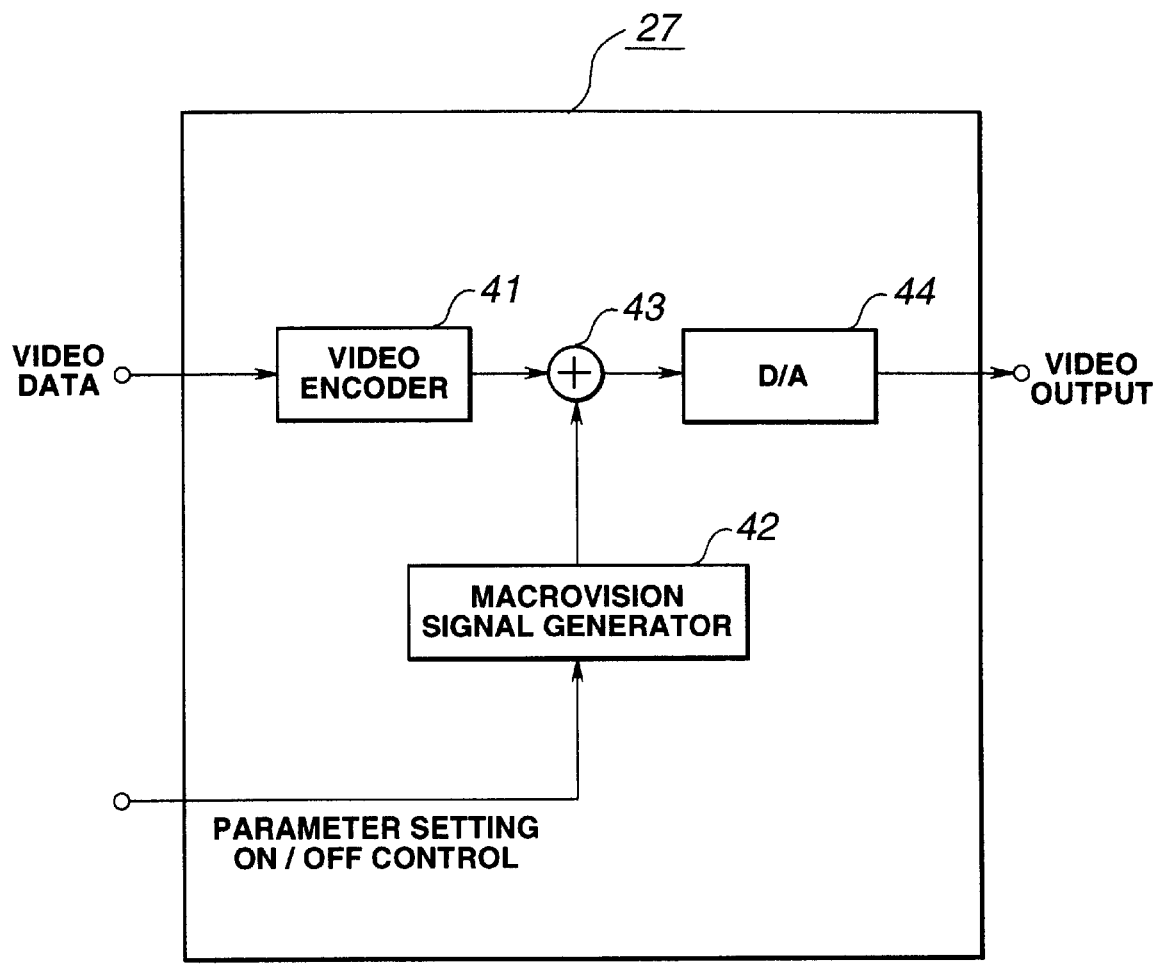
FIG. 13 is a diagram of a video outputting signal processing unit in the satellite broadcasting receiver of FIG. 12.

As shown in FIG. 13, the video outputting signal processor 27 may include a video encoder 41, a macrovision signal generator 42, an adder 43, and a digital-to-analog (D/A) converter 44. The video data from the MPEG2 decoder 25 is supplied to the video encoder 41 so as to be converted into video data conforming to the respective predetermined television standard, such as a NTSC standard. The macrovision signal generator 42 may generate a macrovision signal in response to a parameter setting and/or on/off control signal supplied from the controller 28 (FIG. 12). Such macrovision signal may be combined with the video data from the video encoder 41 by the adder 43. The combined signal from the adder 43 is supplied to the D/A converter 44 so as to be converted into an analog signal and outputted therefrom.

Returning to FIG. 12, the controller 28 in the satellite broadcasting receiver 20 may decode the additional data extracted from the transport stream processor 23 and control various operations such as control of a program table display for copy protection control. Such data decoding function may be performed by a data decoding unit 50 which may be included within the controller 28.

Figure 14:
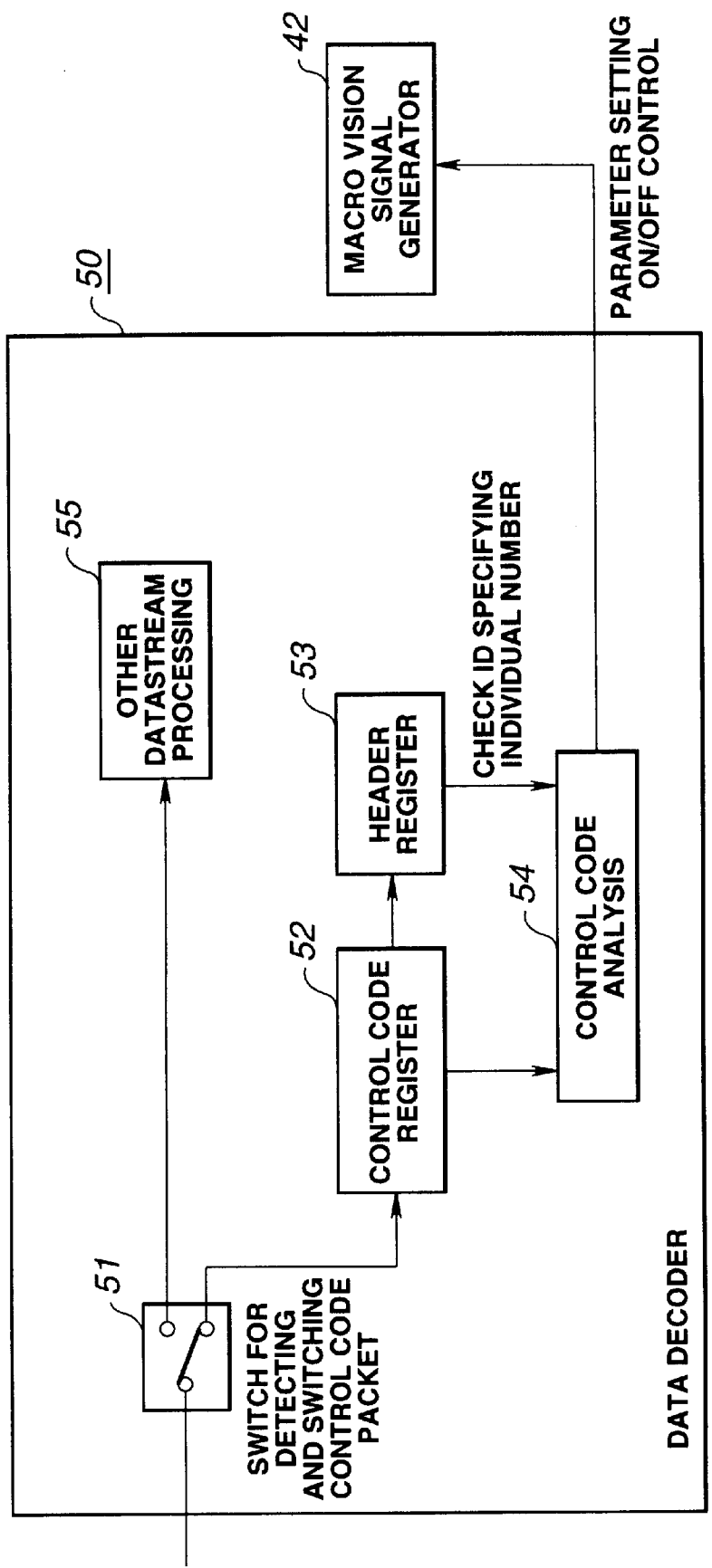
FIG. 14 is a diagram of a data decoder in a controller of the satellite broadcasting receiver of FIG. 12.

As shown in FIG. 14, the data decoding unit 50 may include a switch 51, a control code register 52, a header register 53, a control code analyzer 54, and a data stream processor 55. The control code register 52, the header register 53, and the control code analyzer 54 may be arranged in a shift register configuration.

The switch 51 is adapted to detect a control code packet and to change to the connection state indicated in FIG. 14 upon such detection. Accordingly, upon supplying extracted additional data (which includes a control code having parameter setting data and header information) to the switch 51, the control code and the parameter setting data and the header of a personal number may be supplied to the control code register 52 and the header register 53. The header register 53 may detect only the header of a specified personal number. As a result, the control code analyzer 54 analyzes the control code corresponding to the detected specified personal number supplied by the control code register 52. Based upon such analyzing, the control code analyzer 54 provides on/off control and parameter setting information to the macrovision signal generator 42. This arrangement may enable the data decoding unit 50 to perform code processing for each data string shown in FIG. 10B.

On the other hand, if data other than the control code is supplied to the switch 51, the switch is changed over so as to supply such received data to the other data stream processor 55 whereupon information, such as the program table, may be extracted and control thereof may be provided.

Therefore, as described above, in the present digital satellite broadcasting system, parameters pertaining to a number of types of television receivers may be transmitted from a satellite broadcasting station by way of a satellite to satellite receivers at the subscribers premises. Upon receiving such transmitted parameters, each respective satellite receiver obtains the parameters associated with the respective television. Such obtained parameters are utilized in forming a macrovision signal which is combined with video data and supplied to the respective television receiver. As a result of using parameters associated with the respective television receiver in forming the macrovision signal, the performance of such television receiver may not be adversely affected and picture signals of designated programs which are recorded on the VTR will produce unacceptable pictures upon reproduction so as to provide the desired copy protection. In other words, the present satellite receiver can effectively prevent dubbing to the VTR 70 and yet still supply picture signals to the television receiver 60 which will produce high quality pictures regardless of the type or make of such television receiver.

Figure 15:
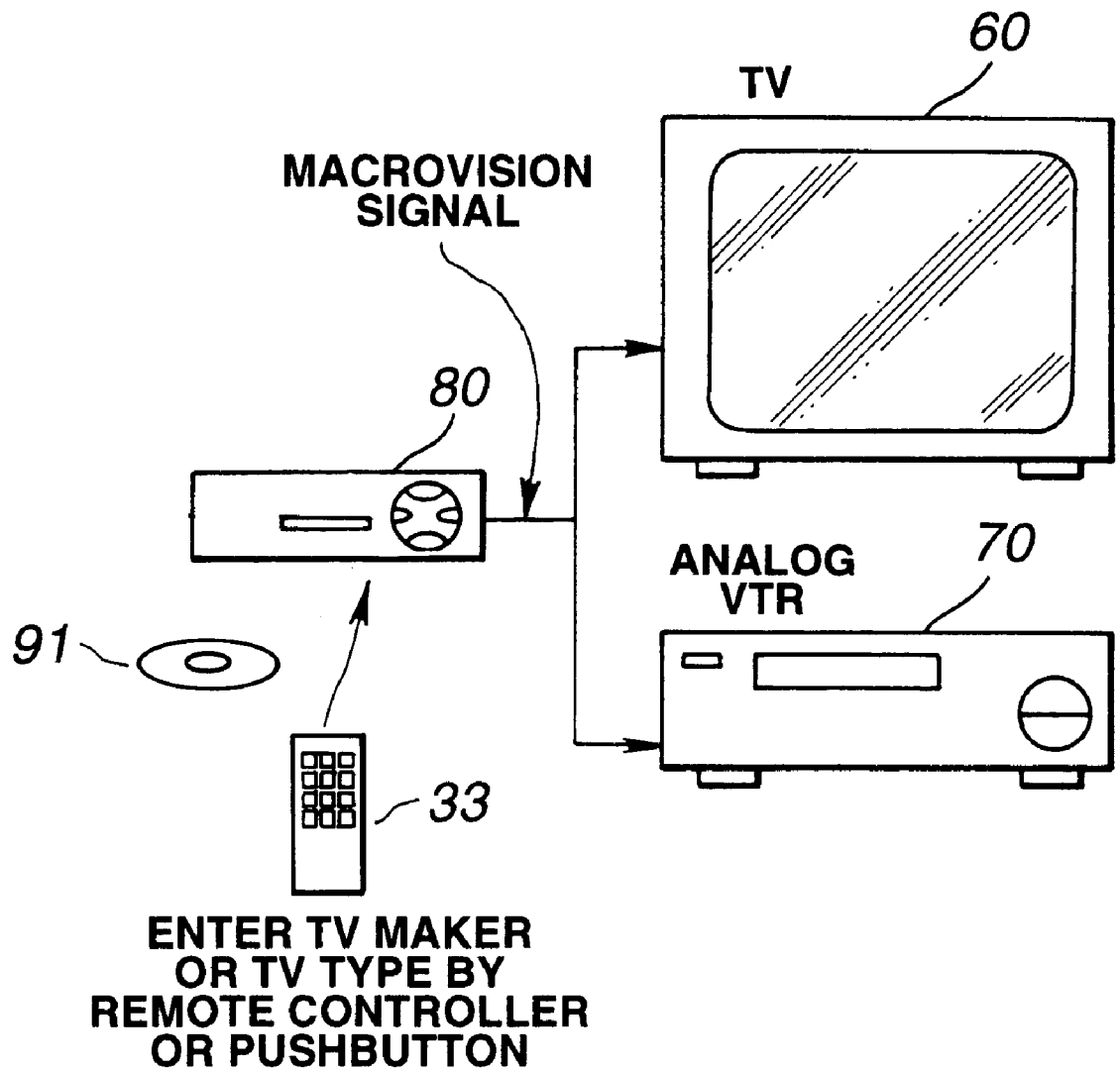
FIG. 15 illustrates a reproducing system according to another embodiment of the present invention.

Another embodiment of the present invention will now be described. Such embodiment may involve the use of a digital video disc (DVD) reproducing device or the like, as illustrated in FIG. 15. As shown therein, video data reproduced by the DVD reproducing device 80 may be supplied to the television receiver 60

Figure 16:
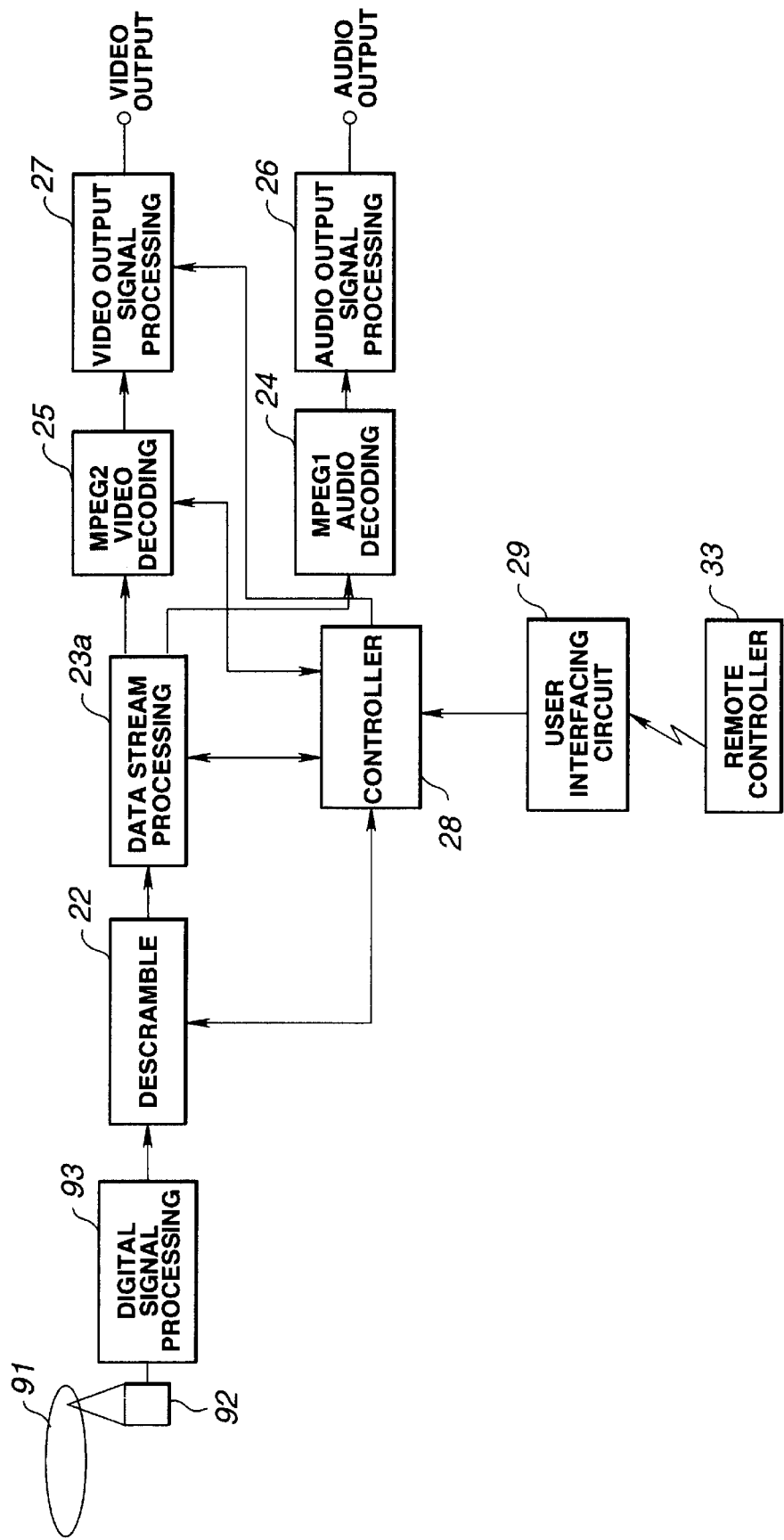
FIG. 16 is a diagram of a DVD reproducing device in the reproducing system of FIG. 15.

As shown in FIG. 16, the digital video disc reproducing device 80 includes an optical pickup 92, a digital signal processor 93, a descrambler 22, a data stream processor 23a, an MPEG1 decoder 24, an MPEG2 decoder 25, a speech outputting signal processor 26, a picture outputting signal processor 27, a controller 28, and a user interfacing circuit 29. A number of these devices are similar to and operate in a similar to those previously described with regard to the satellite broadcasting receiver 20 of FIG. 12 and, as such, the previous description pertaining thereto may also be applied to the DVD reproducing device 80. Accordingly, in the interest of brevity, only a cursory description pertaining to such devices will be provided hereinbelow.

In the DVD reproducing device, the optical pickup 92 may read out picture and audio data recorded on a DVD 91 and supply the same to the digital signal processor 93. The digital signal processor 93 processes the received read-out data in a predetermined manner which may include demodulation and error correction processing and supplies the resulting MPEG2 datastream to the descrambler 22. The descrambler 22 may descrambles the received datastream based on key information from the controller 28 and supplies the descrambled datastream to the transport stream processor 23a. The datastream processor 23a may extract video data and speech or audio data from the received datastream based on PSI from the controller 28. The extracted speech data and picture data are supplied to the MPEG1 decoder 24 and the MPEG2 decoder 25, respectively. The datastream processor 23*a* may also extract additional data from the datastream and supply the extracted additional data to the controller 28. The MPEG1 decoder 24 decodes the audio data from the datastream processor 23*a* in a predetermined manner so as to convert the compressed audio data into pre-compressed audio data and supplies the same to the audio outputting signal processor 26. The audio outputting signal processor 26 processes the received pre-compressed speech data in a predetermined manner which may include digital-to-analog conversion so as to convert the audio data into analog audio signals. The MPEG2 decoder 25 decodes the video data from the datastream processor 23*a* in a predetermined manner so as to convert the compressed video data into pre-compressed video data and supplies the same to the picture outputting signal processor 27. The video outputting signal processor 27 may include a video encoder 41, a macrovision signal generator 42, an adder 43, and a D/A converter 44, such as those shown in FIG. 13. The macrovision signal generator 42 may generate a macrovision signal in accordance with control signals supplied by the controller 28. Such macrovision signal may be combined with picture data by the adder 43 and outputted.

In the above-described DVD reproducing device 80, the user may input or set information such as the name of the manufacturer and the machine type of the television receiver 60 by use of the remote controller 33. Such information or setting signal may be supplied from the remote controller 33 to the controller 28 by way of the user interface 29. In response to such received information, the controller 28 may set or obtain the appropriate parameters for the macrovision signal generator 42 by use of a table which may include previously stored information relating to manufacturers and/or types of the television receivers and associated parameters. This table may be updated by user inputs from the remote controller 33 or by reading pre-set information recorded on the DVD 91.

Thus, the DVD reproducing device 80 may generate a macrovision signal in accordance with a user input by use of the remote controller 33 and may output the generated macrovision signal along with picture data to the television receiver 60. As such, if picture data reproduced by the DVD reproducing device 80 is supplied to the television receiver 60 and to the VTR 70 (as shown in FIG. 15), a picture having acceptable picture quality may be displayed on the television receiver 60, while picture signals which would produce unacceptable pictures are recorded on the VTR. In other words, the DVD reproducing device 80 can prevent dubbing to the VTR 70 and can supply picture signals of high picture quality to the television receiver 60 regardless of the type or make of such television receiver.

Further, the name of the manufacturer or the machine type of the television receiver 60 may be entered or registered with the remote controller 33 by use of codes. That is, a code identifying the respective manufacturer or type of the television receiver may be entered by use of the remote controller 33. As a result, by using the remote controller 33, the user may cause a code signal which identifies the television receiver to be supplied to the controller 28. The controller 28 may utilize such code signal in conjunction with the table to obtain the appropriate parameters for the macrovision signal generator 42, in a manner as previously described.

Although the above embodiment was described for use with a DVD, the present invention is not so limited and may be used with other types of recording and/or reproducing devices. For example, the present invention may be applied to a digital video cassette (DVC) reproducing device or the like.

Although preferred embodiments of the present invention and modifications thereof have been described in detail herein, it is to be understood that this invention is not limited to these embodiments and modifications, and that other modifications and variations may be effected by one skilled in the art without departing from the spirit and scope of the invention as defined by the appended claims.

What is claimed is:

1. A data transmission method comprising the steps of:
    generating parameter setting data associated with a plurality of different copy inhibiting signals for use in copy protection circuits each associated with a monitor device, in which each respective copy inhibiting signal is usable to adversely affect picture recording quality while not adversely affecting picture quality of a picture displayed only on a respective type of monitor device; and
    transmitting a control code including the parameter setting data to data receiving devices each having one of said copy protection circuits.

2. The data transmission method as in claim 1, further comprising the step of adding personal number data as header information to said parameter setting data for discriminating between the data receiving devices, and wherein the transmitting step transmits said control code including the parameter setting data with said personal number data to said data receiving devices.

3. The data transmission method as in claim 2, further comprising the step of generating additional information data common to said data receiving devices, and wherein the transmitting step transmits said control code with said personal number data and the generated additional information data to the data receiving devices.

4. A data transmitting device comprising:
    parameter generating means for generating parameter setting data associated with a plurality of different copy inhibiting signals for use in copy protection circuits each associated with a monitor device, in which each respective copy inhibiting signal is usable to adversely affect picture recording quality while not adversely affecting picture quality of a picture displayed only on a respective type of monitor device; and
    transmission means for transmitting a control code including the parameter setting data of the copy protection circuit to data receiving devices each having one of said copy protection circuits.

5. The data transmitting device as in claim 4, wherein said parameter generating means includes means for adding personal numbers as header information to said parameter setting data which identifies the data receiving devices, and said transmitting means transmits said control code including the parameter setting data with said personal numbers to said data receiving devices.

6. The data transmitting device as in claim 5, further comprising additional information data generating means for generating additional information data common to the data receiving devices, and wherein said transmitting means transmits parameter setting data with said personal numbers and the generated additional information data to the data receiving devices.

7. A method for setting parameters of a copy protection circuit of a data receiving device, said method comprising the steps of:
    receiving a transmitted control code having parameter setting data associated with a plurality of different copy inhibiting signals for a plurality of monitor devices, in which each respective copy inhibiting signal is usable to adversely affect picture recording quality while not adversely affecting picture quality of a picture displayed only on a respective type of monitor device;

extracting the parameter setting data associated with a respective monitor device from the control code; and setting parameter data of the copy protection circuit of said data receiving device for use with said respective monitor device based on the extracted parameter setting data and producing a respective copy inhibiting signal from the set parameter data.

8. The parameter setting method as in claim 7, wherein said parameter setting data includes personal number data as header information for identifying the monitor devices.

9. The parameter setting method as in claim 8, wherein said control code includes said parameter setting data and additional information data for use by said data receiving device.

10. A data transmission system comprising:

a data transmitting device having parameter generating means for generating parameter setting data associated with a plurality of different copy protection signals for use in copy protection circuits each associated with one of a plurality of monitor devices in which each respective copy inhibiting signal is usable to adversely affect picture recording quality while not adversely affecting picture quality of a picture displayed only on a respective type of monitor device and transmitting means for transmitting main data and a control code having the parameter setting data; and a data reception device including a respective one of said copy protection circuits and having means for receiving the transmitted main data and control data and for separating therefrom the received control code, means for obtaining the parameter setting data associated with the respective copy protection circuit from the separated control code and for setting parameters of the respective copy protecting circuit based on the obtained parameter setting data to enable the respective copy protection circuit to generate a respective copy protection signal, and means for combining said main data and said copy protection signal.

11. The data transmission system as in claim 10, wherein said parameter generating means includes means for adding personal number data as header information to said parameter setting data which identifies said data reception device, said transmitting means transmits said main data and said control code having said parameter setting data with said personal number data, and the obtaining means obtains the parameter setting data associated with the respective copy protection circuit by use of the personal number data.

12. The data transmission system as in claim 11, wherein said data transmitting device includes means for generating additional information data for said data reception device, and said transmitting means transmits said the generated additional information data, along with said main data and said control code having said parameter setting data with said the personal number data, to said data reception device for use in operating said data reception device.

13. A reproducing method comprising the steps of:

reproducing signals recorded on a recording medium for display on a monitor device;

generating a respective copy protection signal for said monitor device based on parameter information set by a user and information associated with a plurality of different copy protection signals, in which respective copy inhibiting signal is usable to adversely affect picture recording quality while not adversely affecting picture quality of a picture displayed only on a respective type of monitor device; and combining the reproduced signals and the respective copy protection signal.

14. The reproducing method as in claim 13, wherein the generating step includes detecting an intrinsic code from an infrared light of a remote controller operated by said user, and utilizing the detected intrinsic code in the generation of the respective copy protection signal.

15. A reproducing device comprising:

reproducing means for reproducing signals recorded on a recording medium for display on a monitor device;

means for generating a respective copy protection signal for said monitor device based on parameter information set by a user and information associated with a plurality of different copy protection signals, in which each respective copy inhibiting signal is usable to adversely affect picture recording quality while not adversely affecting picture quality of a picture displayed only on a respective type of monitor device; and means for combining the reproduced signals and said respective copy protection signal and for outputting the combined signal.

16. The reproducing device as in claim 15, wherein the generating means includes code detection means for detecting an intrinsic code from an infrared light of a remote controller, and wherein the generating means utilizes the detected intrinsic code in generating said respective copy protection signal.

17. A data processing device comprising:

means for receiving input signals having picture data and parameter data associated with a plurality of different copy inhibiting signals for a plurality of monitor devices, in which each respective copy inhibiting signal is usable to adversely affect picture recording quality while not adversely affecting picture quality of a picture displayed only on a respective type of monitor device;

means for obtaining the parameter data associated with a respective one of said monitor devices from said input signals and for generating a respective copy inhibiting signal in accordance with the obtained parameter data; and means for combining said picture data and said copy inhibiting signal so as to form a combined signal and for outputting the combined signal for supply to the respective one of said monitor devices.

18. A data processing apparatus adapted to be coupled to a television monitor and a recording/reproducing device for effectively preventing unauthorized copying of designated picture data, said data processing apparatus comprising:

means for receiving input signals having picture data and parameter data associated with a plurality of different copy inhibiting signals for a plurality of television monitors, in which each respective copy inhibiting signal is usable to adversely affect picture recording quality while not adversely affecting picture quality of a picture displayed only on a respective type of television monitor;

means for obtaining the parameter data associated with the respective television monitor coupled to said data processing apparatus from said input signals and for producing a respective copy inhibiting signal for the respective television monitor in accordance with the obtained parameter data; and means for combining said picture data and said respective copy inhibiting signal so as to form a combined signal and for outputting the combined signal for supply to the respective television monitor and said recording/reproducing device;

wherein the respective television monitor displays pictures corresponding to said picture data of said combined signal in an acceptable manner, and wherein, if said combined signal is recorded by said recording/reproducing device, picture signals reproduced therefrom will produce unacceptable pictures when displayed so as to effectively prevent unauthorized copying of said picture data.

19. A data transmission and reception system comprising:

a data transmitting device having parameter generating means for generating parameter data associated with a plurality of different copy inhibiting signals for a plurality of television monitors in which respective copy inhibiting signal is usable to adversely affect picture recording quality while not adversely affecting picture quality of a picture displayed only on a respective type of television monitor and means for transmitting the generated parameter data and picture data; and at least one data reception device adapted to be coupled to a respective television monitor and a recording/reproducing device and including means for receiving the transmitted picture data and parameter data pertaining to said plurality of television monitors, means for obtaining the parameter data associated with the respective television monitor from the transmitted parameter data and for generating a respective copy inhibiting signal in accordance therewith, and means for combining said picture data and said respective copy inhibiting signal so as to form a combined signal and for outputting the combined signal for supply to the respective television monitor and said recording/reproducing device;

wherein the respective television monitor displays pictures corresponding to said picture data of said combined signal in an acceptable manner, and wherein, if said combined signal is recorded by said recording/reproducing device, picture signals reproduced therefrom will produce unacceptable pictures when displayed so as to effectively prevent unauthorized copying of said picture data.

20. A data processing apparatus comprising:

a device for receiving input signals having picture data and parameter data associated with a plurality of different copy inhibiting signals for a plurality of monitor units, in which each respective copy inhibiting signal is usable to adversely affect picture recording quality while not adversely affecting picture quality of a picture displayed only on a respective type of monitor unit;

a device for obtaining the parameter data associated with a respective one of said monitor units from said input signals and for generating a respective copy inhibiting signal in accordance with the obtained parameter data; and a device for combining said picture data and said copy inhibiting signal so as to form a combined signal and for outputting the combined signal for supply to the respective one of said monitor units.

21. A data processing apparatus adapted to be coupled to a television monitor and a recording/reproducing device for effectively preventing unauthorized copying of designated picture data, said data processing apparatus comprising:

a device for receiving input signals having picture data and parameter data associated with a plurality of different copy inhibiting signals for a plurality of television monitors, in which each respective copy inhibiting signal is usable to adversely affect picture recording quality while not adversely affecting picture quality of a picture displayed only on a respective type of television monitor;

a device for obtaining the parameter data associated with the respective television monitor coupled to said data processing apparatus from said input signals and for producing a respective copy inhibiting signal for the respective television monitor in accordance with the obtained parameter data; and a device for combining said picture data and said respective copy inhibiting signal so as to form a combined signal and for outputting the combined signal for supply to the respective television monitor and said recording/reproducing device;

wherein the respective television monitor displays pictures corresponding to said picture data of said combined signal in an acceptable manner, and wherein, if said combined signal is recorded by said recording/reproducing device, picture signals reproduced therefrom will produce unacceptable pictures when displayed so as to effectively prevent unauthorized copying of said picture data.

22. A data transmission and reception system comprising:

a data transmitting device having a parameter generating device for generating parameter data associated with a plurality of different copy inhibiting signals for a plurality of television monitors in which each respective copy inhibiting signal is usable to adversely affect picture recording quality while not adversely affecting picture quality of a picture displayed only on a respective type of television monitor and a device for transmitting the generated parameter data and picture data; and at least one data reception device adapted to be coupled to a respective television monitor and a recording/reproducing device and including a device for receiving the transmitted picture data and parameter data pertaining to said plurality of television monitors, a device for obtaining the parameter data associated with the respective television monitor from the transmitted parameter data and for generating a respective copy inhibiting signal in accordance therewith, and a device for combining said picture data and said respective copy inhibiting signal so as to form a combined signal and for outputting the combined signal for supply to the respective television monitor and said recording/reproducing device;

wherein the respective television monitor displays pictures corresponding to said picture data of said combined signal in an acceptable manner, and wherein, if said combined signal is recorded by said recording/reproducing device, picture signals reproduced therefrom will produce unacceptable pictures when displayed so as to effectively prevent unauthorized copying of said picture data.

* * * * *